United States Patent [19]
Terada et al.

[11] Patent Number: 5,266,619
[45] Date of Patent: Nov. 30, 1993

[54] PLASTIC AUTOMOTIVE BUMPER

[75] Inventors: Masahiro Terada, Kanagawa; Takashi Sugimoto, Mie, both of Japan

[73] Assignees: Nissan Motor Co., Ltd., Yokohama; Mitsubishi Petrochemial Co., Ltd., Tokyo, both of Japan

[21] Appl. No.: 718,404

[22] Filed: Jun. 24, 1991

[30] Foreign Application Priority Data

Jun. 27, 1990 [JP] Japan .................. 2-166871

[51] Int. Cl.$^5$ .................................................. C08K 3/34
[52] U.S. Cl. .................. 524/451; 524/456; 524/505
[58] Field of Search ............ 524/451, 456, 505

[56] References Cited

U.S. PATENT DOCUMENTS

| | | | |
|---|---|---|---|
| 4,363,885 | 12/1982 | Fukui et al. | 525/212 |
| 4,480,065 | 10/1984 | Kawai et al. | 524/418 |
| 4,504,619 | 3/1985 | Yui et al. | 524/426 |

FOREIGN PATENT DOCUMENTS

| | | |
|---|---|---|
| 1271450 | 10/1989 | Japan . |
| 2111071 | 6/1983 | United Kingdom . |
| 2210050 | 6/1989 | United Kingdom . |
| 2213156 | 8/1989 | United Kingdom . |

Primary Examiner—Paul R. Michl
Assistant Examiner—John J. Guarriello
Attorney, Agent, or Firm—Lowe, Price, LeBlanc & Becker

[57] ABSTRACT

A plastic bumper for an automotive vehicle, of the type having so-called floating ribs for the purpose of weight-lightening and preventing surface sinkage due to resin shrinkage. The bumper is formed of a composition comprising (a) propylene-ethylene block copolymer in an amount ranging from 51 to 60 weight %, the block copolymer containing a content soluble in xylene at ordinary temperature, the content ranging from 3 to 8 weight %, and ethylene in an amount ranging from 3 to 8 mol %, the block copolymer having a MFR ranging from 20 to 40 g/10 min; (b) ethylene-propylene based copolymer rubber in an amount ranging from 20 to 30 weight %, the copolymer rubber having a MFR ranging from 0.1 to 2 g/10 min; and (c) talc in an amount ranging from 17 to 25 weight %, said talc having an average particle size ranging from 1.0 to 2.5 μm. Additionally, the composition has (I) a flexural elastic modulus (at 23° C.) not lower than 17000 Kg/cm$^2$, (II) an Izod impact value (at −30° C.) not lower than 6 kg-cm/cm, (III) a coefficient of linear expansion (3 mm thickness, 45 mm length, at 23° to 80° C.) not higher than $7.0 \times 10^{-5}$ (cm/cm/°C.), and (IV) a MFR not lower than 7 g/10 min.

9 Claims, 3 Drawing Sheets

PLASTIC AUTOMOTIVE BUMPER

BACKGROUND OF THE INVENTION

1. Field of the Invention

This invention relates to improvements in a plastic bumper for an automotive vehicle, and more particularly to a plastic bumper shaped to be light in weight and made of a material to cause the bumper to exhibit excellent performance in: resistance upon a light collision, shape maintenance characteristics over a long period of time and gloss and brightness character of a paint coated on the bumper.

2. Description of the Prior Art

Over ten years have lapsed since the material used in bumpers of automotive vehicles changed from steel to plastic. However, no fundamental change in structural mode has been heretofore made in such plastic bumpers, so that progress has been made only in improvement in moldability, shape, dimensional stability and paintability. Examples of such plastic bumpers are shown in FIGS. 1 and 2 and described in detail in Table 1 of the present invention. In FIG. 1, a bumper 1 includes a main body 2 made of plastic. A reinforcement member 3 made of metal is fixedly fitted in the main body 2 and connected to a vehicle body through stays 4. In FIG. 2, a bumper 1' includes a main body 2 which is formed with vertical ribs 5 and horizontal ribs 6. The ribs 5,6 are connected through stays 4 to a vehicle body.

However, difficulties have been encountered in these types of bumpers, in which it is essential to use the reinforcement member while increasing the weight of the bumper. Owing to this, a further weight-lightening requirement for automotive vehicles have not been able to met, thereby preventing progress in weight-lightening of the vehicles. Additionally, such conventional bumpers are problematic because it is difficult to obtain a flat surface without sinkage due to resin shrinkage at ribs, high shape maintenance characteristics over a long period of time and a high gloss and brightness character of a paint film coated on the plastic bumper.

SUMMARY OF THE INVENTION

It is an object of the present invention to provide an improved automotive bumper which can overcome the drawbacks encountered in the conventional plastic automotive bumpers.

Another object of the present invention is to provide an improved automotive bumper which has a sufficient structural strength without using any reinforcement member for the plastic material, which exhibits high shape maintenance characteristics even in use over a long period of time and maintain the high gloss and brightness character of a paint film coated on the surface of the plastic bumper.

A further object of the present invention is to provide an improved automotive bumper which has a particular structure to lighten the weight and to prevent surface sinkage, and is formed of a material which permits the bumper to exhibit an excellent impact resistance under a light collision, which exhibits high shape maintenance characteristics even in use over a long period of time, and maintains the high gloss and brightness character of a paint film coated on the plastic bumper even under such a particular structure.

The automotive bumper of the present invention has integrally formed floating ribs and is formed of a composition or material comprising (a) propylene-based polymer in an amount ranging from 51 to 60 weight %, said block copolymer containing a fraction thereof soluble in xylene at ordinary temperatures in an amount ranging from 3 to 8 weight %, and having an ethylene content in an amount ranging from 3 to 8 mol %, said block copolymer having a MFR ranging from 20 to 40 g/10 min; (b) ethylene-propylene based copolymer rubber in an amount ranging from 20 to 30 weight %, said copolymer rubber having a MFR ranging from 0.1 to 2 g/10 min; and (c) talc in an amount ranging from 17 to 25 weight %, said talc having an average particle size ranging from 1.0 to 2.5 μm. The composition or material has (I) a flexural elastic modulus (at 23° C.) not lower than 17000 Kg/cm$^2$, (II) an Izod impact value (at −30° C.) not lower than 6 kg-cm/cm, (III) a coefficient of linear expansion (3 mm thickness, 45 mm length, at 23° to 80° C.) not higher than $7.0 \times 10^{-5}$ (cm/cm/°C.), and (IV) a MFR not lower than 7 g/10 min.

The bumper of the floating rib construction and formed of the above material is light in weight and exhibits an excellent impact resistance in an impact test conducted at −30° C. and at a speed of 4 km/h by using a pendulum type impact tester. Additionally, the material has a low coefficient of linear expansion, which maintains the high gloss and brightness character of a paint film coated on the surface of the bumper as being molded, which exhibits a smooth flat external surface and a high shape maintenance characteristics even in use for a long period of time.

DETAILED DESCRIPTION OF THE INVENTION

According to the present invention, a bumper for an automotive vehicle has integrally formed floating ribs and is formed of a composition or material comprising:

(a) propylene-based polymer in an amount ranging from 51 to 60 weight %, the block copolymer containing a fraction thereof soluble in xylene at ordinary temperatures, ranging from 3 to 8 weight %, and containing ethylene in an amount ranging from 3 to 8 mol %, the block copolymer having a MFR (Melt Flow Rate) ranging from 20 to 40 g/10 min;

(b) ethylene-propylene based copolymer rubber in an amount ranging from 20 to 30 weight %, the copolymer rubber having a MFR ranging from 0.1 to 2 g/10 min; and (c) talc in an amount ranging from 17 to 25 weight %, the talc having an average particle size ranging from 1.0 to 2.5 μm.

Additionally, the composition or material has:

(I) a flexural elastic modulus (at 23° C.) not lower than 17000 Kg/cm$^2$, (II) an Izod impact value (at −30° C.) not lower than 6 kg-cm/cm, (III) a coefficient of linear expansion (3 mm thickness, 45 mm length, at 23° to 80° C.) not higher than $7.0 \times 10^{-5}$ (cm/cm/°C.), and (IV) a MFR not lower than 7 g/10 min.

Figure 3:
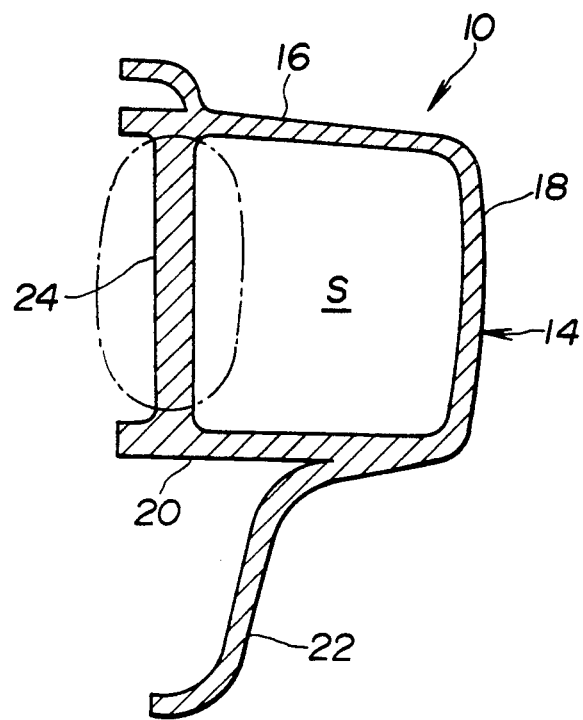
FIG. 3 is a vertical section view of an embodiment of a bumper in accordance with the present invention.
Figure 4:
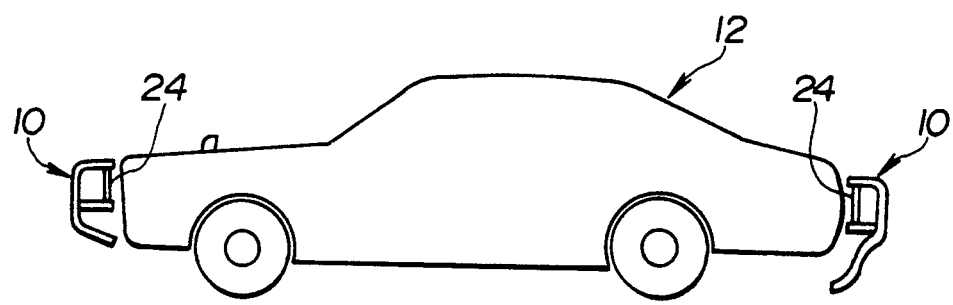
FIG. 4 is a schematic side view of an automotive vehicle equipped with the bumper of FIG. 3.

Referring now to FIGS. 3 and 4 of the drawings, there is shown an embodiment of the bumper designated by the reference numeral 10. The bumper 10 has a cross-sectional shape shown in FIG. 3 and is installed to a vehicle body 12 of an automotive vehicle in a manner shown in FIG. 4. The bumper 10 comprises a main body 14 which includes an upper horizontal wall section 16 which is generally horizontal and extending laterally with respect to the vehicle body 12 upon being installed to the vehicle body 12. A vertical wall section 18 is integral with the upper horizontal wall section 16. The vertical wall section is generally vertical and extends generally laterally with respect to the vehicle body upon the bumper 10 being installed to the vehicle body 12. A lower horizontal wall section 20 is integral with the vertical wall section 18 which is generally parallel with the upper horizontal wall section 16. The lower horizontal wall section 20 is generally horizontal and extends generally laterally upon the bumper 10 being installed to the vehicle body 12. The lower horizontal wall section 20 may be a plurality of horizontal ribs which are spaced from each other and integrally connected with the vertical wall section 18. A guard wall section 22 is integral with the lower horizontal wall section 20 and extends downwardly and obliquely toward the vehicle body upon the bumper being installed to the vehicle body 12. The guard wall section extends in a direction parallel with the vertical wall section 18.

Additionally, a plurality of so-called floating ribs 24 are formed integral with the upper and lower horizontal wall sections 16, 20 in such a manner as to connect the upper and lower horizontal wall sections 16, 20. In case of using the horizontal wall section 20, the floating ribs 24 may be respectively integrally connected with the horizontal ribs 20. The floating wall section 24 extend vertically and are located spaced from each other. Each floating rib 24 is spaced from the vertical wall section 18 to define therebetween a large space S, which is the reason why the ribs 24 has been referred to as the "floating" ribs.

The above-mentioned components (a), (b) and (c) of the plastic material or composition of the bumper 1 will be discussed in detail hereinafter.

A typical example of the component (a) propylene-based polymer is propylene-ethylene block copolymer which containing a fraction thereof soluble in xylene at ordinary temperatures, ranging from 3 to 8 weight %, and containing ethylene in an amount ranging from 3 to 8 mol %, preferably 4 to 6 mol %. The MFR of the propylene-ethylene block copolymer is within a range from 20 to 40 g/10 min, preferably 25 to 35 g/10 min. It is to be noted that if the propylene-ethylene block copolymer is not within the above characteristic ranges, a resultant bumper cannot provide the significant advantages of the present invention.

The ethylene content is measured by a usual method such as a known NMR (nuclear magnetic resonance) method. The content soluble in xylene at ordinary temperature is measured as follows: 2 g of a sample of the propylene-ethylene block copolymer is dipped for 20 min. in 600 g of boiled xylene. Thereafter, the boiled xylene is cooled to room temperature and filtered by a G4 glass filter thereby to obtain an insoluble content. The insoluble content is then dried and weighed to obtain the weight of the insoluble content. The difference in weight between the sample and the insoluble content corresponds to the weight of the content soluble in xylene at ordinary temperature.

It is to be noted that if the propylene ethylene block copolymer has the ethylene content and the xylene-soluble content of the propylene-ethylene block copolymer are respectively not within the above-ranges, the material of the bumper is inferior in flexural elastic modulus and in Izod impact value and therefore unsuitable for the bumper of the present invention.

The MFR (Melt Flow Rate) is a flow rate (g/10 min.) of a resin or the propylene-ethylene block copolymer (kept at 230° C.) flowing through a hole (diameter: 2.0955 mm, axial length: 8 mm) formed in a die under a load of 2.16 kg. This measurement method of the MFR is according to JIS (Japanese Industrial Standard)-K 7210. If the MFR is lower than 20 g/10 min, the moldability of the material and the external appearance of the resultant bumper are inferior. If the MFR is higher than 40 g/10 min, the resultant bumper is inferior in Izod impact value.

It will be understood that the propylene-ethylene block copolymer as the component (a) may be replaced with a mixture of two or more kinds of resins (which may include the propylene-ethylene block copolymer) as long as the mixture has the characteristics within the above-mentioned respective ranges. In this case, a propylene system resin whose characteristics are not within the above-mentioned ranges may be used together with the propylene-ethylene block copolymer within a range not exceeding the above-mentioned range of the propylene-ethylene block copolymer.

Furthermore, the propylene-ethylene block copolymer may be replaced within three- or more-comonomer system copolymer (graft type, random type or block type) or modified copolymer in which propylene-ethylene copolymer may include other monomers, for example, alpha-olefin such as butene-1, hexene-1, octene-1, 4-methylpentene-1 and the like; vinyl ester such as vinyl acetate; unsaturated organic acid such as (meta) acrylic acid (ester), maleic anhydride and the like; and derivatives of unsaturated organic acids. The polymer used in place of the propylene-ethylene block copolymer may be a mixture of various copolymers of the above-mentioned. In this connection, it will be understood that the component(s) other than the ethylene-propylene block copolymer is added within an amount range which does not inhibit the effects of the present invention.

The component (b) or ethylene-propylene based copolymer rubber is ethylene-propylene copolymer rubber (EPM) or may be an ethylene-propylene terpolymer rubber containing small amounts of a third component such as ethylidene norbornene (ENB), dicyclopentadiene (DCP) or the like. The ethylene-propylene based copolymer rubber is has a MFR ranging from 0.1 to 2 g/10 min. The ethylene-propylene based copolymer rubber may be a single copolymer rubber or a mixture of two or more copolymer rubbers (for example, ethylene-propylene copolymer rubber and ethylene propylene terpolymer rubber). In the latter case, the mixture may includes a high viscosity copolymer and a low viscosity copolymer, in which it is not problematic that one of them has a MFR other than the above-mentioned range of the ethylene-propylene based copolymer. It is to be noted that the external appearance of the molded bumper is degraded if the MFR is lower than 0.1 g/10 min. whereas the Izod impact value is insufficient if the MFR is higher than 2 g/10 min.

The component (c) or talc has the average particle size ranging from 1.0 to 2.5 μm. It is to be noted that if the talc has an average particle size other than the above-range, the resultant bumper will be inferior in dimensional stability at high temperatures, in balance between rigidity and impact resistance at low temperatures, in paintability and external appearance. In order to improve such characteristics of the resultant bumper, it is preferable that the talc has a specific surface area not smaller than 35000 cm$^2$/g and such a particle size (substantially not larger than 15 μm) distribution such that a fraction of particle sizes not larger than 10 μm is not less than 95%, a fraction of particle sizes not larger than 5 μm is not less than 80% and a fraction of particle sizes not larger than 1 μm is within a range from 5 to 50%. Additionally, the talc preferably has an average value of aspect ratio not smaller than 5. The aspect ratio is an average ratio between one of the longitudinal and lateral lengths and the thickness of a talc particle. The measurement of the aspect ratio is accomplished under observation through a microscope.

Measurement of the specific surface area is carried out by a usual constant pressure air passing type specific surface area measuring apparatus (according to air penetrating method) such as a powder specific surface area measuring apparatus (SS-100 type) made by Shimazu Seisakusho Co., Ltd. in Japan. Measurement of the particle size distribution is carried out by a light transmittance measurement in a liquid phase sedimentation method thereby to obtain cumulative distribution values. An example of measurement of measuring apparatuses for the particle size distribution is one of the SA-CP type (particularly SA-CP2-20 type) made by Shimazu Seisakusho Co., Ltd. The average particle size is a particle size value at a point of 50% in an accumulated particle size distribution curve obtained by the above-discussed particle size distribution measurement by using the above particle size distribution measuring apparatus. In these measurements, talc may be dispersed in an aqueous solution (as a dispersion medium) containing about 30% of alcohol. This improves dispersion of talc to facilitate the measurements.

The determination of the above-mentioned various physical properties is made on talc (filler) obtained by extracting the talc from a sample (or the molded bumper) by using organic solvent or by burning the sample. The former extracting is carried out by dipping the sample in, for example, xylene at 130° to 140° C. for about 10 hours, and thereafter by separating the talc from the resin under filtration by using a cylindrical filter paper.

Talc having an average particle size not larger than 1.5 μm can be easily obtained by a wet particle size distribution method. The same having an average particle size not smaller than 0.7 μm can be easily obtained by a dry particle size distribution method.

The talc used as the component (c) is prepared as follows: Talc raw ore is pulverized, for example, by a pulverising apparatus such as a tube mill type pulverizer, an impact type pulverizer, a micron mill type pulverizer, a centrifugal roller type Raymond mill. If a further fine pulverization is required, the thus pulverized talc raw ore is further pulverized in a dried state or in a wet state by a pulverizer such as a micron mill, a jet pulverizer, an agitating pulverizer mill (a tower mill), a vibration mill, and a colloid mill.

The thus pulverized talc is subjected to dry or wet classification one or plural times by using a classifying apparatus such as a cyclone, a multicyclone, a micron separator, a jetclone, a classiclone, a rake classifier, a hydrocyclone, a hydraulically operated classifier and a centrifugal classifier. By thus classifying talc particles, the talc having the required physical properties is prepared. In order to obtain the talc as the component (c) of the bumper of the embodiment, the talc raw ore is preferably obtained from the China, Australia or United States of America, in what that from china is particular preferable. The talc as the component (c) may be surface-treated with esters, glycols, coupling agents, fatty acids or their metallic salts and surface active agents. Such a surface treatment is effective for improving the performance of the resultant automotive bumper.

The blended ratio (in weight %) of the components (a), (b) and (c) of the composition as the material for the bumper of the embodiment is as follows: Relative to the total amount of the components (a), (b) and (c), the component (a) is within the range from 51 to 60 weight %, preferably from 53 to 58 weight %; the component (b) is within the range from 20 to 30 weight %, preferably 22 to 27 weight %; and the component (c) is within the range from 17 to 25 weight %, preferably 18 to 23 weight %.

The above ranges are determined for the following reasons: If the component (a) is less than 51 weight %, the resultant bumper is not satisfactory in moldability and mechanical strength. If the component (a) exceeds 60 weight %, the resultant bumper is inferior in dimensional stability and rigidity. Thus, the composition having the component (a) outside the above-mentioned range is unsuitable for the material for the bumper of the embodiment.

If the component (b) is less than 20 weight %, the resultant bumper is inferior in paintability and in low temperature impact resistance. If the component (b) exceeds 30 weight %, the resultant bumper is inferior in rigidity and in scratch resistance. Thus, the compôsition having the component (b) outside the above-mentioned range is unsuitable for the material for the bumper of the embodiment.

If the component (c) is less than 17 weight %, the resultant bumper is too inferior in dimensional stability at high temperatures and insufficient in rigidity. If the component (c) exceeds 25 weight %, the resultant bumper is inferior in external appearance, paintability, moldability and low temperature impact resistance. Thus, the composition having the component (c) outside the above-mentioned range is unsuitable for the material of the bumper of the embodiment.

It will be understood that other additives may be added to the material or composition of the bumper of the embodiment comprising the components (a), (b) and (c), in an amount within a range which does not affect the advantageous effect of the present invention. Examples of the additives are organic and inorganic fillers which are other than the talc (as the component (c)) and have been subjected or not subjected to any treatment; rubber and latex components other than the ethylene-propylene based copolymer rubber (as the component (b)); thermosetting and thermoplastic resins other than the propylene-based polymer (as the component (a)); and usual ones such as a variety of stabilizers, pigment, dispersant, crosslinking agent, forming agent, flame retarder, nucleating agent, antistatic additive and paintability improving agents. It will be appreciated that addition of the additives improves the resultant bumper in electroplating ability, paintability, bonding ability, luster, moldability, tapping ability, kneading ability, weld strength, creep resistance, dimensional stability heat resistance and the like. Particularly preferred additives include calcium carbonate, barium sulphate, titanium oxide and/or zinc oxide.

The composition as the material of the bumper of the embodiment can be prepared by blending the three components (a), (b) and (c) with or without the additives by using usual kneading devices such as a monoaxial extruder, a biaxial extruder, a banbury mixer, a roll, a bravendor plastograph and a kneader. Usually, preparation of the composition is carried out by kneading the mixture of the three components (a), (b) and (c) with or without the additives by using a usual extruder or the like thereby to be formed into compound of the pellet type. Therefore, the pellet type compound will be molded into a desired shape. Otherwise, preparation of the composition as the material of the bumper may be carried out by directly supplying the three components (a), (b) and (c) with or without the additives into one of a variety of usual molding machines, in which kneading is simultaneously performed in the molding machine. Moreover, preparation of the composition may be carried out by previously kneading the talc (the component (c)) and ethylene-prolylene based copolymer rubber with or without the additives at relatively high concentrations thereby to prepare a master batch. The master batch is diluted and blended with a polymer containing ethylene and/or a propylene-based polymer to obtain a blended compound. The blended compound is thereafter molded into a desired shape.

The bumper made of the above-composition or material is required to have the above-mentioned physical properties including (I) the flexural elastic modulus, (II) the Izod impact value, (III) the coeffecient of linear expansion and (IV) the MFR. These physical properties will be discussed in detail hereinafter.

(I) FLEXURAL ELASTIC MODULUS

Measured at 23° C. according to JIS K 7203.

If the flexural elastic modulus is insufficient, deformation of the bumper is large and damage to the vehicle body to which the bumper is installed occurs during a light collision. If the distance between the bumper and the vehicle body is enlarged to prevent the damage of the vehicle body, freedom in design will be unavoidably limited thereby making it impossible to obtain vehicle designs desired by users. In order to minimize deformation of the bumper, the composition as the material of the bumper is required to have the flexural elastic modulus not lower than 17000 kg/cm$^2$.

(II) IZOD IMPACT VALUE

Measured at −30° C. according to JIS K 7110.

If the Izod impact value is insufficient, the bumper exhibits insufficient deformation and the bumper shatters, causing damage to the vehicle body while scattering broken pieces of bumper, causing a secondary accidents. In order to prevent such accidents, the composition of the material of the bumper is required to have the Izod impact value not lower than 6 kg-cm/cm.

(III) COEFFICIENT OF LINEAR EXPANSION

Changes in length of a specimen having the dimension of 45 mm length, 10 mm width and 3 mm thickness is measured throughout 23° C. to 80° C. by a commercially available horizontal silica tube type dilatometer produced according to ASTM D 696-79. Values of the measured changes are averaged to obtain the value of the coefficient of linear expansion.

The bumper of an automotive vehicle is usually secured to fixed metal stays projected from the vehicle body. Accordingly, if a large linear dimensional change in the bumper occurs in accordance with ambient temperature variation, parts including the metal stays are unavoidably deformed thereby degrading the quality of the automotive vehicle. Thus, the composition as the material of the bumper is required to have the coefficient of linear expansion not higher than $7.0 \times 10^{-5}$ (cm/cm°C.).

(IV) MFR (MELT FLOW RATE)

Measured at 230° C. and under 2.16 kg load according to JIS K 7210 (as same as measurement of the MFR of the component (a)).

If the MFR is too low, moldability of the bumper is lowered thereby degrading the external appearance of the resultant bumper. Thus, the composition of the material of the bumper is required to have the MFR not lower than 7 g/10 min.

The composition including the components (a), (b) and (c) is suitable for the material of the bumper of the type as shown in FIGS. 3 and 4. The bumper of this type has the floating ribs (24) which are formed integral with the main body (14) simultaneously during molding of the main body. The reason why the ribs take a floating structure is to prevent surface sink due to shrinkage at the locations of the ribs while maintaining a structural rigidity of the bumper. The number of the floaring ribs are not particularly limited but is preferably selected to maintain the predetermined cross-sectional shape (as shown in FIG. 3) even at bumper collision. It will be understood that if the number of the floating ribs is too small, the bumper tends to easily deform at the collision, thus degrading the vehicle body protection ability. In view of these, the number of the floating ribs is preferably about ten, in which the pitch of the ribs is about 10 to 15 cm. The location of each floating rib is preferably one-sided to the vehicle body as shown in FIG. 4, which minimizes deformation of the bumper at the collision. The thickness (in the width direction of the vehicle body) of each floating rib is preferably 3 to 5 mm from view points of moldability and collision resistance. The width (in the longitudinal direction of the vehicle body) of each floating rib is preferably 10 to 30 mm.

Fabrication or molding methods for the bumper according to the present invention is not limited to a particular one, in which injection molding is most preferable among a variety of methods.

EXAMPLE

In order to evaluate the bumper of the present invention, Examples 1 to 5 according to the present invention will be discussed in comparison with Comparative Examples 1 to 14.

Eight kinds of the component (a) or propylene-ethylene block copolymer to be used are shown in Table 2, in which the eight kinds are different in property from each other. Five kinds of the component (b) or ethylene-propylene based copolymer rubber to be used are shown in Table 3, in which the five kinds are different in component and property from each other. In Table 3, "B-1" represents a mixture of propylene-ethylene copolymer and ethylene-propylene-diene terpolymer; "B-2" represents ethylene-propylene-diene terpolymer; "B-3" represents propylene-ethylene copolymer; "B-4" represents ethylene-propylene-diene terpolymer; and "B-5" represents propylene-ethylene copolymer. Two kinds of the component (c) or talc to be used are shown in Table 4, in which the two kinds are different in property from each other.

EXAMPLES 1 TO 5 AND COMPARATIVE EXAMPLES 1 TO 14

The respective components (a), (b) and (c) were blended in amounts shown in the column of each of the Examples and Comparative Examples in Table 5 thereby to obtain a mixture of each of the Examples and Comparative Examples. 100 parts by weight of the mixture was further blended with 0.08 part by weight of tris (2,4-di-t-butylphenyl) phosphite and 0.1 part by weight of tetrakis [methylene-3-(3',5'-di-t-butyl-4'-hydroxyphenyl) propionate] methane. After mixing, the blended mixture was kneaded and pelletized at 230° C. by a FCM biaxial kneader thereby obtaining a composition corresponding to each of Examples and Comparative Examples.

Thereafter, the composition was molded by a inline screw type injection molding machine thereby to obtain a specimen corresponding to each of Examples and Comparative Examples. The specimen was subjected to tests to measure or evaluate the flexural elastic modulus, the Izod impact value, the coefficient of linear expansion and the MFR. The results of tests are shown in Table 5. Additionally, the specimen was coated with one-liquid type polyurethane paint and baked at 120° C. The surface of the thus paint-coated specimen was visually observed to evaluate the gloss and brightness character of the coated paint film. The results of this evaluation are shown in Table 5 in which "A" represents a good result; "B" represents a slightly inferior result; and "C" represents an inferior result.

Figure 5A:
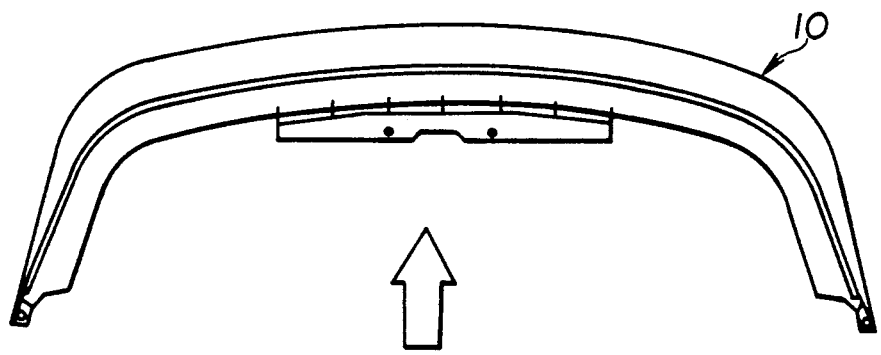
FIG. 5A is a plan view of a bumper according to the present invention, used in evaluation tests for thé present invention.
Figure 5B:
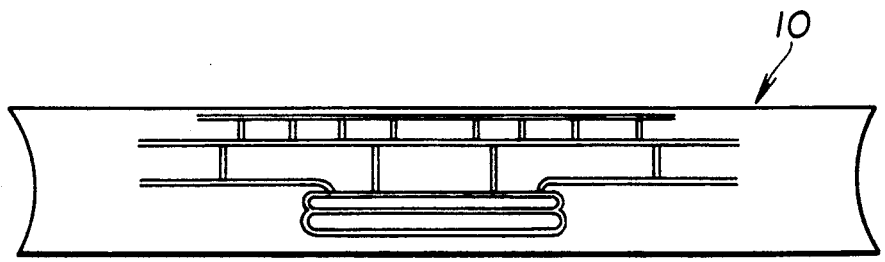
FIG. 5B is a rear view as viewed from the direction of an arrow.

The above composition corresponding to each of the Examples and Comparative Examples was further molded at 230° C. by a large-sized inline screw type injection molding machine to obtain a bumper (specimen) of the type having the floating ribs as shown in FIGS. 5A and 5B in which an average thickness of a major part of the bumper was 3.5 mm, and the number of the floating ribs was eight. The thus injection-molded bumper was subjected to an impact test according to FMVSS (Federal Motor Vehicle Safety Standards) Part 581. This impact test was conducted at a collision speed of 4 km/h and under temperature conditions of −30° C. and 23° C. upon the bumper being assembled and installed to a vehicle body without using a reinforcement member, in which the load of a pendulum type impact tester was regulated at 1.4 ton. The results of this impact test are shown as "(1) impact resistance" at temperatures of 23° C. and −30° C. and "(2) bumper deformation" in Table 5.

Concerning the results of "(1) impact resistance" at 23° C. in Table 5, "A" represents a condition in which no breakage occurred both in the bumper, and no damage occurred in the vehicle body; "B" represents a condition in which no breakage occurred in the bumper while damage occurred in the vehicle body; "C" represents a condition in which breakage occurred in the bumper, and damage occurred in the vehicle body.

Concerning the results "(1) impact resistance" at −30° C. in Table 5, "A" represents a condition in which no breakage occurred in the bumper, and damage occurred in the vehicle body; "B" represents a condition in which a slight breakage occurred in the bumper while no damage occurred in the vehicle body; and "C" represents a condition in which breakage occurred in the bumper, and damage occurred in the vehicle body.

Concerning the results of "(2) bumper deformation" at 23° C. in Table 5, "A" represents a condition in which the amount of deformation of the damper was less than that of a conventional damper; and "C" represents a condition in which the amount of deformation of the bumper is not less than the conventional bumper.

Furthermore, the bumper (specimen) was subjected to a thermal cycle test under a condition in which the bumper was installed to the vehicle body, thereby to evaluate a shape maintenance characteristics of the bumper. The thermal cycle test consists of two cycles each of which has a part of +90° C. and a part of −40° C. The results of this test are shown in Table 5 in which "A" represents a condition in which no change in shape of the bumper occurred; "B" represents a condition in which a slight change in shape occurred; and "C" a change in shape occurred.

As will be appreciated from the results in Table 5, the compositions of Examples 1 to 5 exhibit excellent quality balances while providing bumpers which are high in performance. In contrast, the compositions of Comparative Examples 1 to 14 are inferior in quality balance while providing bumpers which tend to be easily broken and are low in shape maintenance characteristics.

TABLE 1

Figure 1:
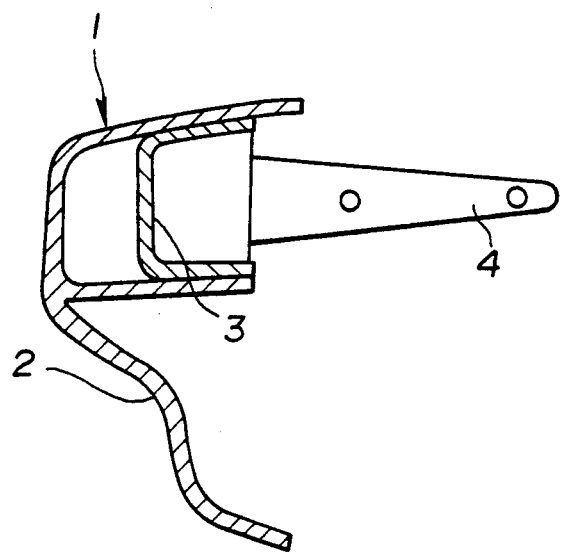
FIG. 1 is a vertical sectional view of an example of a conventional bumper for an automotive vehicle.
Figure 2:
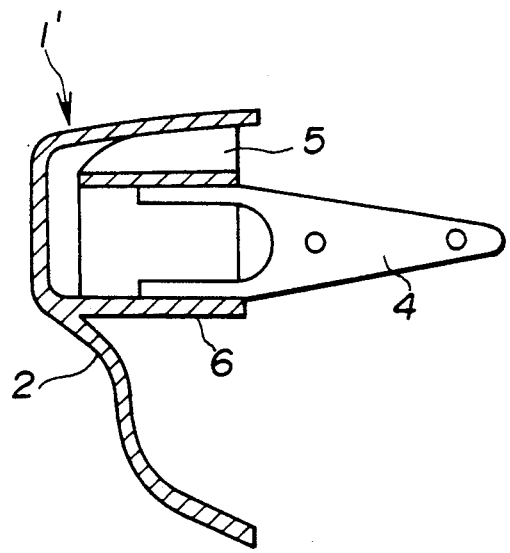
FIG. 2 is a vertical sectional view of another example of a conventional bumper for an automotive vehicle.

| Arrangement of bumper | | Characteristics of resin material | | | |
|---|---|---|---|---|---|
| Basic sectional shape | Feature | Material | Flexural elastic modulus kg/cm² | Izod impact value (−30° C.) kg-cm/cm | Coefficient of liner expansion × 10 (cm/cm/°C.) | Automotive Vehicle |
| Shown in FIG. 1 | Impact energy is absorbed mainly by a reinforcement member (4 mm thickness). | Polypropylene resin | 8000–12000 | 8–5 | 16–8 | Small-sized passenger car |
| Shown in FIG. 2 | Vertical and horizontal ribs (5–6 mm thickness) are integrally formed. Vertical ribs are partly floated without a reinforce- | Polypropylene resin | 11000 | 6 | 9 | light passenger car |

TABLE 1-continued

| Arrangement of bumper | | Characteristics of resin material | | | | |
|---|---|---|---|---|---|---|
| Basic sectional shape | Feature | Material | Flexural elastic modulus kg/cm² | Izod impact value (−30° C.) kg-cm/cm | Coefficient of liner expansion × 10 (cm/cm/°C.) | Automotive Vehicle |
| | ment member. | | | | | |

TABLE 2

| Component (a) "propylene-ethylene block copolymer" | Content soluble in xylene (Wt %) | Ethylene content (mol %) | MFR (g/10 min) |
|---|---|---|---|
| A-1 | 6 | 6 | 30 |
| A-2 | 8 | 6 | 30 |
| A-3 | 10 | 15 | 30 |
| A-4 | 7.5 | 2 | 30 |
| A-5 | 25 | 5 | 30 |
| A-6 | 2 | 5 | 30 |
| A-7 | 7.5 | 5 | 80 |
| A-8 | 7.5 | 5 | 5 |

TABLE 3

| Component (b) "Ethylene-propylene based copolymer rubber" | MFR (g/10 min) |
|---|---|
| B-1 | 0.5 |
| B-2 | 0.3 |
| B-3 | 0.7 |
| B-4 | 0.04 |
| B-5 | 8 |

TABLE 4

| Component (c) "Talc" | Average particle size (μm) |
|---|---|
| C-1 | 1.7 |
| C-2 | 4 |

TABLE 5

| | Example | | | | | Comparative Example | | | | |
|---|---|---|---|---|---|---|---|---|---|---|
| | 1 | 2 | 3 | 4 | 5 | 1 | 2 | 3 | 4 | 5 |
| Composition | | | | | | | | | | |
| Component (a) | | | | | | | | | | |
| Kind | A-1 | A-1 | A-1 | A-2 | A-1 | A-3 | A-4 | A-5 | A-6 | A-7 |
| wt % | 56 | 56 | 54 | 56 | 60 | 56 | 56 | 56 | 56 | 56 |
| Component (b) | | | | | | | | | | |
| Kind | B-1 | B-2 | B-3 | B-1 | B-2 | B-2 | B-2 | B-2 | B-2 | B-2 |
| wt % | 24 | 24 | 26 | 24 | 20 | 24 | 24 | 24 | 24 | 24 |
| Component (c) | | | | | | | | | | |
| Kind | C-1 | C-1 | C-1 | C-1 | C-1 | C-1 | C-1 | C-1 | C-1 | C-1 |
| wt % | 20 | 20 | 20 | 20 | 20 | 20 | 20 | 20 | 20 | 20 |
| Flexural Elastic Modulus kg/cm | 18900 | 18700 | 18200 | 18000 | 19500 | 15300 | 19800 | 14000 | 19000 | 18700 |
| Izod impact value −30° C., kg-cm/cm | 8.9 | 8.9 | 8.5 | 7.8 | 6.5 | 10.5 | 4.5 | 12.0 | 5.2 | 3.5 |
| Coefficient of linear expansion cm/cm/°C. × 10⁻⁵ | 5.8 | 5.7 | 5.4 | 5.5 | 6.5 | 5.2 | 7.5 | 5.0 | 7.8 | 5.9 |
| MFR g/10 min | 11 | 10 | 12 | 10 | 14 | 9 | 13 | 8 | 14 | 19 |
| Gloss and brightness character | A | A | A | A | A | A | B | A | C | A |
| Bumper Performance | | | | | | | | | | |
| Moldability | A | A | A | A | A | A | A | A | A | A |
| Impact test | | | | | | | | | | |
| (1) Impact resistance | | | | | | | | | | |
| 23° C. | A | A | A | A | A | C | A | C | B | C |
| −30° C. | A | A | A | A | A | A | C | B | C | C |
| (2) Bumper deformation (amount) 23° C. | A | A | A | A | A | C | A | C | C | A |
| Thermal cycle test (+90° C.−−40° C.) | A | A | A | A | A | B | B | B | B | A |

| | Comparative Example | | | | | | | | |
|---|---|---|---|---|---|---|---|---|---|
| | 6 | 7 | 8 | 9 | 10 | 11 | 12 | 13 | 14 |
| Composition | | | | | | | | | |
| Component (a) | | | | | | | | | |
| Kind | A-8 | A-1 | A-2 | A-1 | A-1 | A-1 | A-1 | A-1 | A-1 |
| wt % | 56 | 56 | 56 | 45 | 70 | 80 | 30 | 66 | 41 |
| Component (b) | | | | | | | | | |
| Kind | B-2 | B-4 | B-5 | B-1 | B-1 | B-1 | B-1 | B-1 | B-1 |
| wt % | 24 | 24 | 24 | 35 | 10 | 10 | 35 | 24 | 24 |
| Component (c) | | | | | | | | | |
| Kind | C-1 | C-1 | C-1 | C-2 | C-1 | C-1 | C-1 | C-1 | C-1 |
| wt % | 20 | 20 | 20 | 20 | 20 | 10 | 35 | 10 | 35 |
| Flexural Elastic Modulus kg/cm | 19000 | 18500 | 18900 | 15200 | 20100 | 14000 | 17200 | 15900 | 21100 |
| Izod impact value −30° C., kg-cm/cm | 9.0 | 5.5 | 5.6 | 12.0 | 3.9 | 4.5 | 15 | 6.5 | 4.0 |
| Coefficient of linear expansion cm/cm/°C. × 10⁻⁵ | 6.0 | 7.1 | 5.6 | 4.5 | 9.2 | 11.0 | 4.3 | 6.8 | 5.8 |
| MFR g/10 min | 0.5 | 9 | 15 | 7 | 18 | 20 | 2 | 13 | 8 |
| Gloss and brightness character | A | B | A | A | C | C | C | A | C |

TABLE 5-continued

| Bumper Performance | | | | | | | | | |
|---|---|---|---|---|---|---|---|---|---|
| Moldability | C | C | A | B | A | A | C | A | B |
| Impact test | | | | | | | | | |
| (1) Impact resistance | | | | | | | | | |
| 23° C. | — | — | C | C | C | C | — | B | B |
| −30° C. | — | — | C | B | C | C | — | C | C |
| (2) Bumper deformation (amount) 23° C. | A | A | C | C | C | C | A | C | C |
| Thermal cycle test (+90° C.−−40° C.) | — | — | A | C | A | C | — | B | A |

What is claimed is:

1. An automotive bumper integrally molded to have a one-piece structure and having integrally formed floating ribs, said bumper being formed of a composition comprising:
   (a) a propylene-based polymer in an amount ranging from 51 to 60 weight %, said polymer having an ethylene content in an amount ranging from 3 to 8 mol % and containing a fraction soluble in xylene at ordinary temperatures in an amount ranging from 3 to 8 weight %, said propylene-based polymer having a MFR ranging from 20 to 40 g/10 min;
   (b) an ethylene-propylene based copolymer rubber in an amount ranging from 20 to 30 weight %, said copolymer rubber having a MFR ranging from 0.1 to 2 g/10 min; and
   (c) talc in an amount ranging from 17 to 25 weight %, said talc having an average particle size ranging from 1.0 to 2.5 μm;
   said composition having
   (I) a flexural elastic modulus at 23° C. of at least 17000 Kg/cm$^2$,
   (II) an Izod impact value at −30° C. of at least 6 kg-cm/cm,
   (III) a coefficient of linear expansion of a specimen having a 3 mm thickness and a 45 mm length measured throughout 23° to 80° C. less than $7.0 \times 10^{-5}$ cm/cm/°C., and
   (IV) a MFR of at least 7 g/10 min.

2. An automotive bumper as claimed in claim 1, wherein said propylene-based polymer includes a propylene-ethylene copolymer.

3. An automotive bumper as claimed in claim 1, wherein said bumper includes a main body to which said floating ribs are integral to define a space between each floating rib and said main body.

4. An automotive bumper as claimed in claim 3, wherein said main body extends laterally relative to a vehicle body and has a generally C-shaped cross-section to leave a clearance, in which each floating rib is disposed to fill said clearance in a cross-section.

5. An automotive bumper as claimed in claim 1, wherein said propylene-based polymer is one selected from the group consisting of a first copolymer containing a propylene-ethylene copolymer, a mixture of said first copolymer and a second polymer, and a third copolymer containing a propylene-ethylene copolymer and at least one kind of unsaturated organic compounds, and a mixture of at least two of said first, second and third copolymers.

6. An automotive bumper as claimed in claim 1, wherein said ethylene-propylene based copolymer rubber is one selected from the group consisting of ethylene-propylene copolymer rubber, ethylene-propylene-diene terpolymer, and a mixture of said ethylene-propylene copolymer rubber and said terpolymer.

7. An automotive bumper as claimed in claim 1, wherein said talc has a specific surface area not smaller than 30000 m$^2$.

8. An automotive bumper as claimed in claim 1, wherein said composition further comprises at least one additive to improve characteristics of said bumper.

9. An automotive bumper integrally molded to have a one-piece structure and having an upper generally horizontal wall section extending laterally relative to a vehicle body, a generally vertical wall section to which an impact may be applied at collision of an automotive vehicle against an object, said horizontal wall section being integrally connected with said horizontal wall section at its first end, a plurality of floating ribs which extend generally vertically and integrally connected with said horizontal wall section at a position near a second end which is opposite to said first end so that a major part of said horizontal wall section covers a large space defined between said vertical wall section and said floating ribs;
   said bumper being formed of a composition comprising
   (a) a propylene-ethylene-based block copolymer in an amount ranging from 51 to 60 weight %, said block copolymer having an ethylene content in an amount ranging from 3 to 8 mol % and containing a fraction soluble in xylene at ordinary temperatures in an amount ranging from 3 to 8 weight %, said block copolymer having a MFR ranging from 20 to 40 g/10 min;
   (b) an ethylene-propylene based copolymer rubber in an amount ranging from 20 to 30 weight %, said copolymer rubber having a MFR ranging from 0.1 to 2 g/10 min; and
   (c) talc in an amount ranging from 17 to 25 weight %, said talc having an average particle size ranging from 1.0 to 2.5 μm;
   said composition having
   (I) a flexural elastic modulus at 23° C. of at least 17000 Kg/cm$^2$,
   (II) an Izod impact value at −30° C. of at least 6 kg-cm/cm,
   (III) a coefficient of linear expansion of a specimen having a 3 mm thickness and a 45 mm length measured throughout 23° to 80° C. less than $7.0 \times 10^{-5}$ cm/cm/°C., and
   (IV) a MFR of at least 7 g/10 min.

* * * * *